United States Patent [19]

Walker

[11] Patent Number: 5,321,409
[45] Date of Patent: Jun. 14, 1994

[54] RADAR SYSTEM UTILIZING CHAOTIC CODING

[75] Inventor: W. T. Walker, Tucson, Ariz.

[73] Assignee: Hughes Missile Systems Company, Los Angeles, Calif.

[21] Appl. No.: 85,995

[22] Filed: Jun. 28, 1993

[51] Int. Cl.$^5$ .................. G01S 13/28; G01S 13/30
[52] U.S. Cl. .................... 342/202; 342/204; 342/132; 342/134; 342/135; 342/201
[58] Field of Search ............ 342/21, 132, 134, 135, 342/145, 202, 201, 204

[56] References Cited

U.S. PATENT DOCUMENTS

| | | | |
|---|---|---|---|
| 3,721,985 | 3/1973 | Perfitt ............................. | 342/388 |
| 3,855,593 | 12/1974 | Van Hijfte et al. ............ | 342/202 X |
| 4,121,211 | 10/1978 | Cusack ........................... | 342/200 |
| 4,132,991 | 1/1979 | Wocher et al. ................ | 342/134 |
| 4,379,295 | 4/1983 | Lewis et al. ................... | 342/201 |
| 4,513,288 | 4/1985 | Weathers et al. ............. | 342/201 |
| 4,566,010 | 1/1986 | Collins ........................... | 342/201 |
| 4,894,660 | 1/1990 | Thomson et al. .............. | 342/129 |

Primary Examiner—John B. Sotomayor
Attorney, Agent, or Firm—Randall M. Heald; Charles D. Brown; Wanda K. Denson-Low

[57] ABSTRACT

A radar system (20) has a chaotic code source (22) with a chaotic code output (23), which generates a chaotic code according to a chaotic difference equation. The radar system (20) further includes a transmitter (24) with a carrier signal source (28) of a carrier signal (29), and an encoder (30) having as a first input the carrier signal (29) of the carrier signal source (28) and as a second input the chaotic code output (23) of the chaotic code source (22), and as an output a transmitted radar signal (36) having the chaotic code output (23) encoded onto the carrier signal (29). A radar system receiver (26) includes a correlator (46) having as a first input the chaotic code output (23) of the chaotic code source (22) and as a second input a received radar signal (44), and as an output an indication of the correlation of the first and second inputs. The correlation is used to determine the distance, speed, or other characteristic of an object that reflected the radar signal.

12 Claims, 2 Drawing Sheets

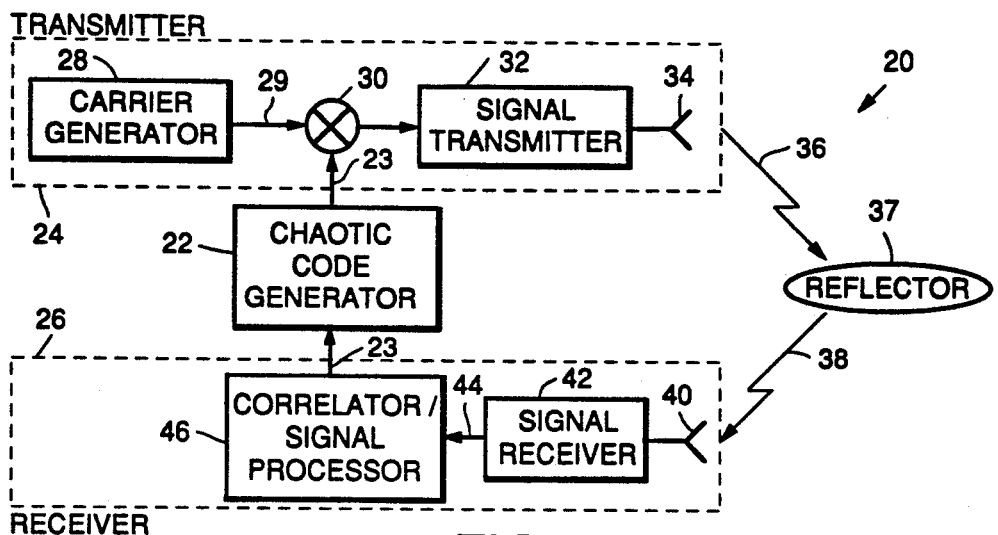
FIG. 1.
FIG. 2.
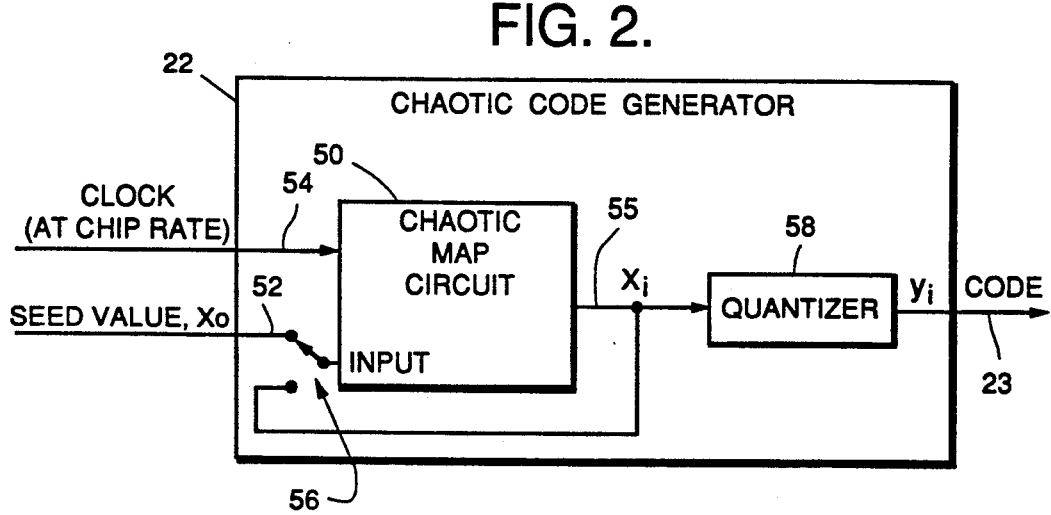
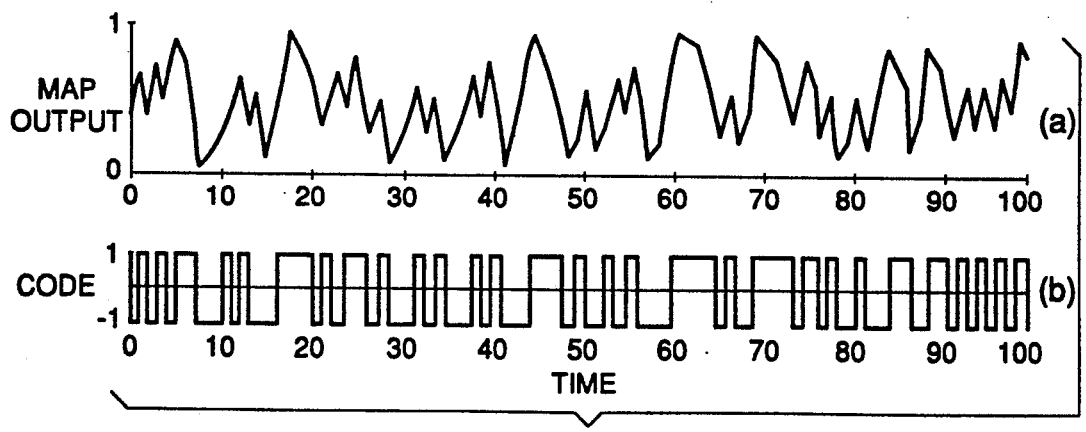
FIG. 3.

RADAR SYSTEM UTILIZING CHAOTIC CODING

BACKGROUND OF THE INVENTION

This invention relates to a radar system, and, more particularly, to a radar system in which the waveform of the transmitted radar signal is determined according to chaotic coding.

In a radar system, a transmitter generates a transmitted radar wave which is propagated through free space. If the transmitted radar wave strikes an object, a portion of its energy is scattered and reflected from the object. A radar receiver has an antenna that receives a portion of the reflected energy. The received signal is analyzed to determine some characteristic of the object that reflected the radar wave, such as its distance or speed.

In many types of radar systems, the transmitted radar signal is produced by encoding a carrier signal with a code such as a binary code. The code may be encoded onto the frequency, phase, amplitude, or other characteristic of the carrier signal. The coding is carried by the transmitted and received radar signals, and the correlation of the received code with the transmitted code serves as the basis for obtaining information about the object that reflects the radar wave.

For example, if the wave form phase of the transmitted radar signal is encoded with a time series of a known type of code, that same code is correlated to the wave form of the received radar signal to determine the time interval between transmission and receipt of the radar signal. The time interval translates directly to a distance from the transmitter to the object and thence to the receiver, since the propagation velocity of the radar signal is at the constant speed of light. In the common case where the radar transmitter and receiver are at the same location, the radar signal propagation distance is twice the distance between the transmitter/receiver and the target.

Great care is taken in selecting the form of the code used to encode the radar signal. In many cases, the code is a repetitive sequence of individual binary pulses that is readily analyzed by the radar receiver. The rate of repetition of the sequence limits the maximum range of the radar, because at greater ranges there can be uncertainty as to which repetition is being matched to the received signal. The repetition rate of the binary pulses within the sequence determines the ranging resolution of the radar, because the receiver cannot resolve distances less than the distance associated with one binary pulse width. The number and character of the binary pulses within each sequence, prior to repetition, determines in part the ability of the radar to unambiguously correlate the transmitted and received signals. Finally, the nature of the coding may be important in minimizing the ability of countermeasures to negate the effectiveness of the radar system, a concern for military radars.

Thus, in selecting the coding used in a radar system, there is a constant tension between these various considerations. To obtain good ranging resolution of the radar, the pulse width of one bit of the code should be small. But to obtain good maximum range, there should be a low code sequence repetition rate. There is therefore a need for a radar utilizing a long coding sequence that is readily correlated between the transmitted and received radar signals.

Many different types of coding have been developed, studied, and used in an attempt to optimize the performance of radar systems. While these codings are operable in various situations, there is still a need for improvement in radar system performance by selection of improved signal coding. The present invention fulfills this need, and further provides related advantages.

SUMMARY OF THE INVENTION

The present invention provides a radar system that utilizes an improved signal coding approach. This coding has an arbitrarily long sequence length, not a fixed length as in most existing codes. As a result, the individual pulse widths may be made quite small, producing good ranging resolution. At the same time, the number of pulses in each sequence can be made quite large, producing a maximum range for the radar that is not limited by coding considerations. The coding also is resistant to interception and analysis by receivers not informed of the coding sequence, thereby minimizing the effectiveness of countermeasures against the radar system in military applications.

In accordance with the invention, a radar system comprises means for transmitting a transmitted radar wave having a wave form determined according to a chaotic code, and means for receiving a reflection of the transmitted radar wave from an object and for determining a characteristic of the object from the reflection of the transmitted radar wave.

More specifically, a radar system comprises a chaotic code source having a chaotic code output. A transmitter includes a carrier signal source of a carrier signal, and an encoder having as a first input the carrier signal of the carrier signal source and as a second input the chaotic code output of the chaotic code source, and as an output a transmitted radar signal having the chaotic code output encoded onto the carrier signal. A receiver includes a correlator having as a first input the chaotic code output of the chaotic code source and as a second input a received radar signal, and as an output an indication of the correlation of the first and second inputs.

In a preferred embodiment, a radar system comprises means for transmitting a transmitted radar wave having a wave form determined according to a chaotic code, and a receiver. The receiver comprises a multielement delay line having as an input a received baseband radar signal and as an output a plurality of copies of the received baseband radar signal that are temporally offset from each other. The receiver further includes a correlator including a multiplier having as a first input a sequence of the chaotic code and as a second input the plurality of temporally offset copies of the received baseband radar signal produced by the delay line, and having as an output a bit-by-bit product of the sequence of the chaotic code and each copy of the received baseband radar signal, and an adder that adds the bit-by-bit products for each copy of the received baseband radar signal. There may be multiple correlators to permit more rapid identification of a single object, or simultaneous identification of multiple objects.

An important feature of the present invention is the use of a chaotic coding sequence to encode the transmitted radar signal, and the use of that same coding sequence to correlate against the received radar signal. Preferably, the chaotic code sequence is a series of numbers generated by a chaotic mapping difference equation. Such sequences are nonperiodic and unpredictable, while being readily correlatable. The pulse width of the individual pulses in a coding sequence can be made as short as permitted by hardware limitations, producing good ranging resolution. The length of the sequence in number of pulses can be quite long, leading to a maximum range of the radar that is not limited by the sequence length. The existence and generation of chaotic codes has long been known, but their application in radar signal coding and the related advantages of their use in radar signal coding have not been known previously.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 1 is a block diagram of a radar system according to the invention;

FIG. 2 is a block diagram of a chaotic code source;

FIG. 3 is a schematic depiction of an example of the functioning of the radar transmitter, wherein FIG. 3(a) is a map output of the chaotic code source and FIG. 3(b) is a quantized form of the map output.

DETAILED DESCRIPTION OF THE INVENTION

Figure 4:
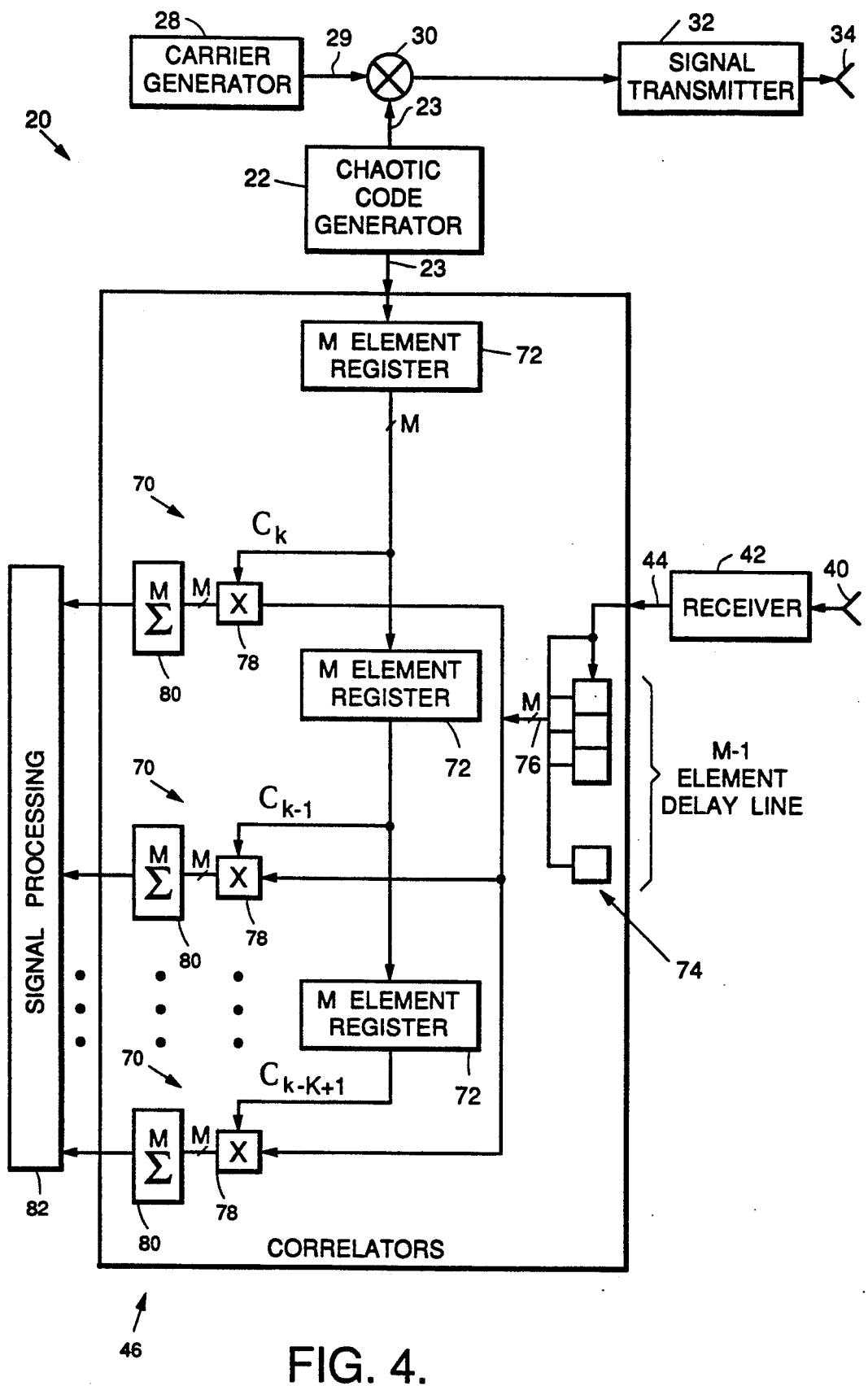
FIG. 4 is a block diagram of a preferred embodiment of the radar system.

FIG. 1 illustrates in general form a preferred pulsed radar system 20 according to the present invention. This preferred radar system 20 produces a pulsed, phase-modulated radar signal. The present invention is also applicable to other types of radar systems such as continuous wave or non-sinusoidal ("carrier-less") systems.

The radar system 20 includes a chaotic code source 22 that generates a chaotic code output 23 and furnishes that output to a transmitter 24 and to a receiver 26. The transmitter 24 includes a carrier signal source 28 that produces a carrier signal 29 such as a sine wave or other periodic wave form. The carrier signal is provided as a first input to an encoder 30, also termed a mixer. A second input to the encoder 30 is the chaotic code output of the chaotic code source 22. The encoder 30 phase modulates the phase of the carrier signal with the chaotic code signal. (Equivalently, a comparable encoder could modulate other characteristics of the carrier signal with the chaotic code output signal.)

A transmitted radar signal output of the encoder 30 is provided to a radar signal transmitter 32 of conventional type. The nature of the signal transmitter 32 is selected to be compatible with the frequency range of the radar system, but typically includes an amplifier such as a magnetron amplifier. The output of the signal transmitter is fed to a transmitting antenna 34, which radiates the radar signal into free space as a transmitted radar signal 36.

The transmitted radar signal 36 impinges upon a reflector or object 37. The object 37 reflects a portion of the transmitted radar signal 36 as a reflected radar signal 38. A portion of the reflected radar signal 38 is received by a receiving antenna 40 of the receiver 26. The receiving antenna 40 is here illustrated for generality as being different from the transmitting antenna 34, but in many cases they will utilize the same physical antenna structure with conventional signal isolating circuitry.

The portion of the reflected radar signal 38 received by the receiving antenna 40 is processed by a conventional signal receiver 42. The signal receiver 42 is selected to be compatible with the frequency of the radar signal. In general, the signal receiver 42 converts the received portion of the reflected radar signal 38 to intermediate frequency and demodulates a received baseband radar signal 44 from the intermediate frequency signal.

The received baseband radar signal 44 is provided to a correlator/signal processor 46. The preferred form of the correlator/signal processor 46 will be discussed in relation to FIG. 4. Generally, however, the correlator/signal processor 46 receives as a first input the chaotic code output 23 of the chaotic code source 22 and as a second input the received radar signal 44. The correlator/signal processor 46 determines the temporal displacement required to accomplish an acceptable degree of correlation between the two inputs 23 and 44. The temporal displacement is a direct measure of the total time of flight, at the speed of light, of the transmitted radar signal 36 and the reflected radar signal 38. One-half of the temporal displacement times the speed of light is the distance of the object 37 from the antenna 34/40, in the case where they are at the same location.

FIG. 2 illustrates the chaotic code source 22 in greater detail. The chaotic code source 22 includes a chaotic code map circuit 50. The chaotic code map circuit 50 produces a chaotic sequence, which is a series of numbers generated according to a chaotic difference equation. Such an equation is generally of the form $$C_n = f(C_{n-1}, C_{n-2}, \ldots S)$$

where $C_n$ is the nth term of the sequence, f denotes the functional dependence, and S is the seed value. Such chaotic difference equations may be one-dimensional or multi-dimensional. They are typically characterized by the Lyapunov coefficient that is greater than zero. Chaotic sequences, chaotic difference equations, and their characterization are all known in the art, and are described, for example, in the following publications, whose disclosures are incorporated by reference: H-O Peitgen et al., *Chaos and Fractals: New Frontiers of Science*, New York: Springer-Verlag, 1992; H. G. Schuster, *Deterministic Chaos: An Introduction*, Weinheim, Federal Republic of Germany: Physik-Verlag, 1988, pages 24–31; and A. Rodriquez-Vazquez et al., "Chaos from Switched-capacitor Circuits: Discrete Maps," *Proc. IEEE*, Special Issue on Chaotic Systems, vol. 75, pages 1090–1106 (1987). Chaotic sequences have been used in several fields of art, but not for determining the modulation of radar signals.

By contrast, in the past radar systems have utilized a variety of techniques for coding the signals. Barker and MPS codes have fixed lengths rather than the arbitrarily long chaotic codes. Random codes use random numbers, and are not generated by a mapping procedure as for the chaotic codes. Pseudonoise codes are generated by a linear feedback shift register operating in a linear fashion, unlike the nonlinear approach of chaotic coding. Legendre coding is found by determining quadratic residues and is constrained to particular fixed lengths. Chaotic codes are developed in a different way, and have no such length constraints. Complementary codes are sets of codes whose autocorrelations sum to zero except at a mainlobe. Chaotic codes do not have this construction or characteristic. Frank codes are constrained to particular lengths, unlike chaotic codes. P4 codes select the phase of chips by a specific, nonchaotic equation. Welti codes are four-phase code pairs whose autocorrelations sum to zero, in a manner similar to complementary codes, and unlike chaotic codes. Finally, concatenation codes use combinations of other types of known codes.

Most of these types of coding are of fixed or defined sequence lengths, which are determined to minimize sidelobes experienced during the correlation operation. The chaotic code may be of indefinite length without repetition, avoiding the limitation of sequence length on radar range. Because of the indefinite length of the chaotic code, the pulse widths (also termed "chip" widths) may be made quite narrow, improving the time resolution and thence distance resolution of the correlation operation.

There are numerous types of chaotic maps. In order to illustrate the operation of the chaotic code source 22, it is helpful to consider one particular such map, but the present approach is not limited to this illustrative chaotic map. One type of chaotic map is a dyadic map wherein $$x_{i+1} = \begin{cases} \dfrac{x_i}{c} & 0 \leq x_i \leq c \\ \dfrac{x_i - c}{1 - c} & c < x_i \leq 1 \end{cases}$$

for all $0 < c < 1$. To determine a chaotic code sequence from such a map in the map circuit 50, a value for c is built into the map and a first value of $x_i$, the seed value S, is provided, numeral 52. The map circuit 50 calculates values of $x_i$ at a rate determined by a clock signal 54, the desired chip rate of the chaotic code source 22.

To calculate the first calculated value of the output x (numeral 56), $x_1$, the seed value 52 is introduced as $x_0$ into the above relation in the map circuit 50 through a switch 56. Thereafter, the switch 56 is switched so that the input of the map circuit 50 is the prior output $x_i$. The map circuit 50 thereafter recursively calculates $x_{i+1}$ values from the prior $x_i$ values and the value of c, at the clock rate 54.

FIG. 3(a) illustrates the first 100 values of $x_i$ for the dyadic map with $c = \frac{1}{2}$ and a seed value of 0.34. The outputs $x_i$ all vary between 0 and 1 in a manner that is unpredictable (unless the map circuit and one of the $x_i$ values are known) and not repeating.

The output values of $x_i$ are not used directly to modulate the carrier signal 29. Instead, in the preferred approach the values of $x_i$ are quantized to $-1$ or $+1$ in a quantizer 58 by selecting the chaotic code output 23 to be $-1$ if x is less than 0.5 and to be $+1$ if x is equal to or greater than 0.5. This choice produces an output 23 with equal numbers of $-1$'s and $+1$'s, but the result could be intentionally biased if desired. FIG. 3(b) illustrates the first 100 values of the chaotic code output 23 corresponding to the map circuit output 56 of FIG. 3(a). These chaotic code outputs 23 are provided to the transmitter 24 and the receiver 26, as discussed for FIG. 1.

FIG. 4 illustrates the radar system 20, with a preferred embodiment of the correlator/signal processor 46 shown in greater detail for a preferred pulsed radar system. Here, the carrier signal 29 is pulsed, so that the transmitted signal 36 is a series of pulses. The bit stream of the chaotic code output is broken into segments or sequences $C_j$, each M bits long, and these sequences are used to modulate the carrier signal 29. The lengths of the sequences, the value of M, can be varied to make the individual chips of as short a duration as desired, within the limits of the clock rate and available hardware.

The correlator/signal processor 46 includes at least one, and preferably a plurality of, correlators 70. Each correlator 70 is provided as a first input with the M bits of a sequence $C_k$ by way of an associated M-element register 72. In the embodiment of FIG. 4, a number of correlators 70 are provided. The correlators are provided with the M bits of the $C_k, C_{k-1}, \ldots, C_{k-K+1}$ most recent values of the sequence generated by the chaotic code source 22.

The received baseband radar signal 44 is provided to an $M-1$ element delay line 74. An output 76 of the delay line 74 is provided as a second input to each of the correlators 70. The series of delayed outputs 76 of the delay line 74 are time-shifted copies of the signal 44 that are sequentially provided to each of the correlators 70, effectively moving the received baseband radar signal 44 past the fixed sequence C of each correlator 70 to permit the calculation of a correlation in each case. The correlation is performed by the correlator 70 by multiplying together the first input value of C and the second input value of the delay line output 76 in a multiplier 78, on a bit-by-bit basis. The products on a bit-by-bit basis are summed by an adder 80.

The sums are provided to a circuit 82 (which may include a microprocessor) for signal processing. In the idealized case of a single object 37, the largest of the outputs of the adders 80 is taken to indicate the correlation of the chaotic code output 23, and the received baseband radar signal 44. The time displacement between the transmitted and received signals is determined from the sequence value and the delay line value that produced the greatest correlation. More complex logic and analysis, beyond the scope of the present invention, may be applied in the event that there are multiple objects and/or attempts to confuse the analysis through countermeasures.

After the time displacement is determined, the distance from the antennas 34/40 to the object 37 is calculated as one-half of the product of the time displacement and the speed of light. Other types of signal processing, also beyond the scope of the present invention, can also be performed.

The use of chaotic coding of the transmitted radar signal has important advantages over prior approaches, as discussed herein. Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A radar system, comprising:
   a chaotic code source having a chaotic code output;
   a transmitter including
      a carrier signal source of a carrier signal, and
      an encoder having as a first input the carrier signal of the carrier signal source and as a second input the chaotic code output of the chaotic code source, and as an output a transmitted radar signal having the chaotic code output encoded onto the carrier signal; and
   a receiver including
      a correlator having as a first input the chaotic code output of the chaotic code source and as a second input a received radar signal, and as an output an indication of the correlation of the first and second inputs.

2. The radar system of claim 1, wherein the chaotic code source includes a source of a one-dimensional chaotic code source map.

3. The radar system of claim 1, wherein the chaotic code source includes
   a chaotic map generator having as an input a selectable seed value or an immediately prior output of the chaotic map generator, and as an output a current output of the chaotic map generator, and
   a quantizer having as an input the current output of the chaotic map generator.

4. The radar system of claim 1, wherein the encoder includes
   a multiplier having as a first input the radar carrier signal and as a second input a time series of the chaotic code source, and as an output a modulated transmitted radar signal.

5. A radar system, comprising:
   means for transmitting a transmitted radar wave having a wave form determined according to a chaotic code; and
   means for receiving a reflection of the transmitted radar wave from an object and for determining a characteristic of the object from the reflection of the transmitted radar wave.

6. The radar system of claim 5, wherein the means for transmitting includes
   a chaotic code source that produces a chaotic code, and
   a transmitter including
      a carrier signal source of a carrier signal, and
      an encoder having as a first input the carrier signal of the carrier signal source and as a second input the chaotic code of the chaotic code source, and as an output a transmitted radar signal.

7. The radar system of claim 5, wherein the means for receiving includes
   a correlator having as a first input a chaotic code and as a second input the reflection of the transmitted radar wave.

8. The radar system of claim 5, wherein the means for receiving includes
   a plurality of correlators, each correlator having as a first input a sequence of chaotic code and as a second input the reflection of the transmitted radar wave.

9. The radar system of claim 8, wherein each correlator utilizes a different sequence of chaotic code.

10. A radar system, comprising:
    means for transmitting a transmitted radar wave having a wave form determined according to a chaotic code; and
    a receiver, comprising
       a multielement delay line having as an input a received baseband radar signal and as an output a plurality of copies of the received baseband radar signal that are temporally offset from each other,
       a correlator including
          a multiplier having as a first input a sequence of the chaotic code and as a second input the plurality of temporally offset copies of the received baseband radar signal produced by the delay line, and having as an output a bit-by-bit product of the sequence of the chaotic code and each copy of the received baseband radar signal, and
          an adder that adds the bit-by-bit products for each copy of the received baseband radar signal.

11. The radar system of claim 10, wherein the means for transmitting includes
    a chaotic code source that produces a chaotic code, and
    a transmitter including
       a carrier signal source of a carrier signal, and
       an encoder having as a first input the carrier signal of the carrier signal source and as a second input the chaotic code of the chaotic code source, and as an output a transmitted radar signal.

12. The radar system of claim 10, the receiver comprising
    a plurality of correlators, each correlator including
       a multiplier having as a first input a sequence of the chaotic code and as a second input the plurality of temporally offset copies of the received baseband radar signal produced by the delay line, and having as an output a bit-by-bit product of the sequence of the chaotic code and each copy of the received baseband radar signal, and
       an adder that adds the bit-by-bit products for each copy of the received baseband radar signal.

* * * * *